Figure 1:
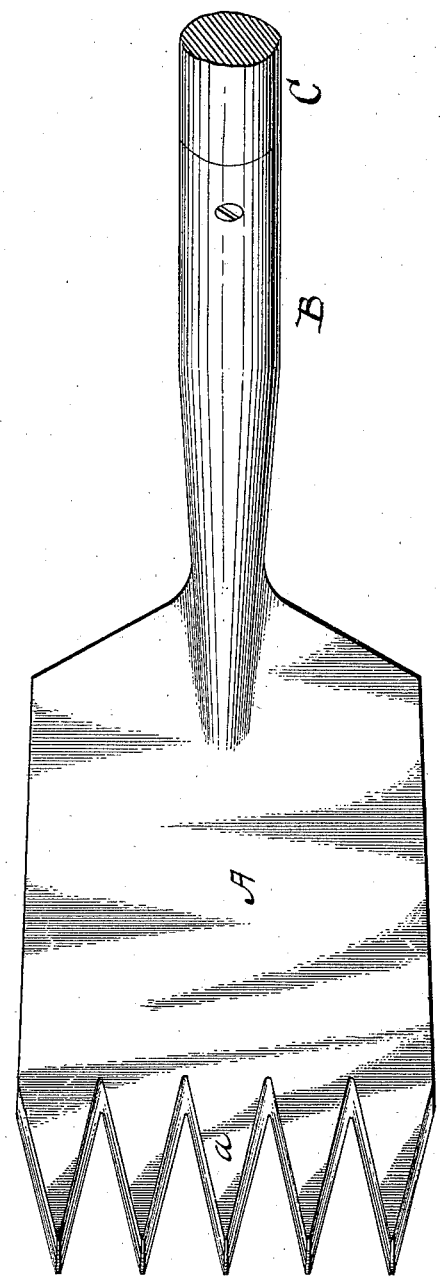

No. 685,961. Patented Nov. 5, 1901.
W. E. WOOD.
ICE SHAVER.
(Application filed Aug. 5, 1901.)
(No Model.)

UNITED STATES PATENT OFFICE.

WILLIAM E. WOOD, OF ARLINGTON, MASSACHUSETTS.

ICE-SHAVER.

SPECIFICATION forming part of Letters Patent No. 685,961, dated November 5, 1901.

Application filed August 5, 1901. Serial No. 70,838. (No model.)

*To all whom it may concern:*

Be it known that I, WILLIAM E. WOOD, of Arlington, in the county of Middlesex and State of Massachusetts, have invented a new and useful Improvement in Ice-Shavers, of which the following is a specification.

In packing ice in an ice-house as the thickness of the various cakes is not always the same an uneven surface is presented by the top of each layer. It is very desirable that this surface should be smoothed off, and this has heretofore been done by the use of a flat chisel-shaped tool on the end of a long wooden handle or by the use of an adz. The adz is objectionable, because in using it the chips fly toward the user, and, moreover, an adz is apt to slip and may cut the boot of the user. The chisel-tool is not satisfactory, because it is flat, and the chisel edge does not always accomplish what is required.

My improvement consists in a shaver which is curved slightly, so that the user in operating on a slightly-projecting cake can shave off as much or as little of the projection as he wishes by simply rocking the blade of the tool slightly, thus raising its cutting edge a half inch or any desired distance above the level of the cake on which the shaver is resting, and by pushing it along shave off exactly the right quantity to accomplish what he desires. I prefer to provide this tool with an edge consisting of a series of teeth, as shown.

This invention is embodied in the device shown in the drawings, in which—

Figure 2:
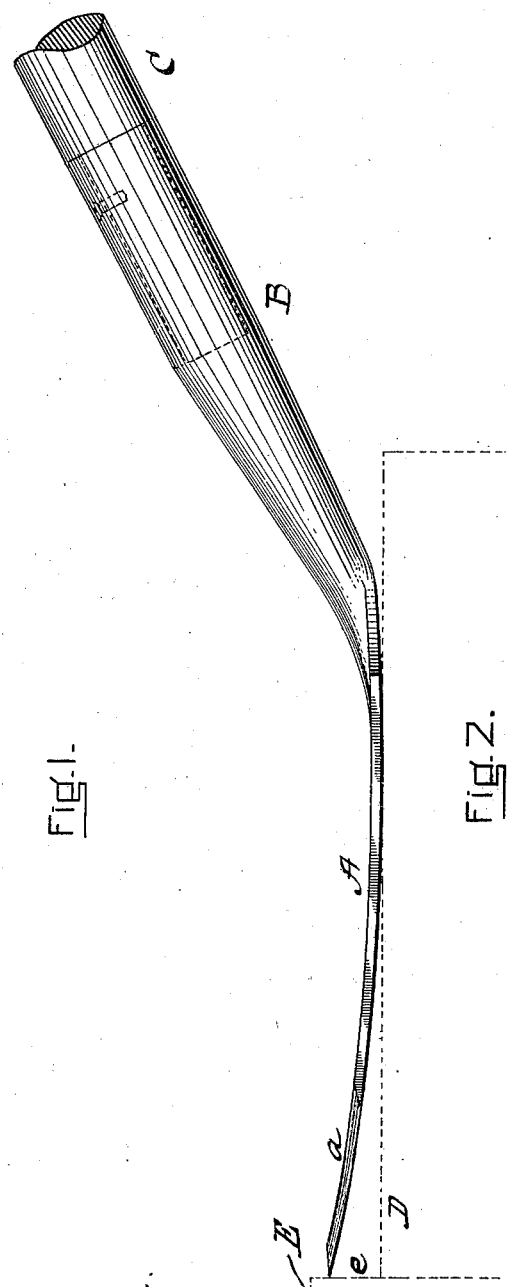

Figure 1 is a plan view, and Fig. 2 a side elevation, of such a shaver.

A is the blade of the shaver, which has preferably at its outer end a series of projecting points *a*, which may be easily ground upon the upper edge to keep them sharp. This blade has projecting from its other end a shank B at an angle to its face, which shank is provided with a socket to receive the wooden handle C, a portion only of which is shown in the drawings, this handle being, preferably, say, four feet long.

It will be noted in Fig. 2 that the blade A is curved slightly, so that it may be rocked on its under surface to present the tips *a* of the projecting points at any height above the cake upon which it is resting. In Fig. 2 there are indicated two cakes D E, the line *e* indicating the vertical projection of the cake E above the level of the cake D. As the shaver is pushed along the user rocks the tool so that, as shown in Fig. 2, the points will strike, say, three-eighths of an inch above the level of the cake D, and pushing the tool along shaves off so much of the top edge of the cake E as lies above this point of contact. If he wishes to shave off more than this, he raises the handle C of the tool, thus lowering the edge of the blade, so that it will strike, say, one-eighth or one-quarter of an inch above the level of the top of the cake D, as seems desirable.

This tool is very simple and has proved a great improvement in utility over both the tools above mentioned. The fact that its under surface is curved enables it to be rocked, and hence to be used in a way in which it is impossible to use a flat-bladed tool, and its edge when provided with projections more easily enters the ice than if it were a chisel edge.

I have shown and described my shaver with a wooden handle separable from the shank; but it is evident that the shank and handle may be made in one piece.

What I claim as my invention is—

1. A hand ice-shaver consisting of a blade provided with an edge adapted to chip the projections from an ice surface, and having at its other end a shank at an angle thereto, said blade being curved on its under surface as described.

2. A hand ice-shaver consisting of a toothed blade and a shank at an angle thereto, said blade having a rocking under surface whereby the level of its cutting edge above the surface of the ice may be varied, as and for the purposes set forth.

In testimony whereof I hereunto set my name this 1st day of August, 1901.

WILLIAM E. WOOD.

Witnesses:
  GEORGE O. G. COALE,
  M. E. FLAHERTY.